June 13, 1950    M. B. MORGAN    2,510,996
DIFFERENTIAL CARRIER
Filed May 14, 1945    2 Sheets-Sheet 2
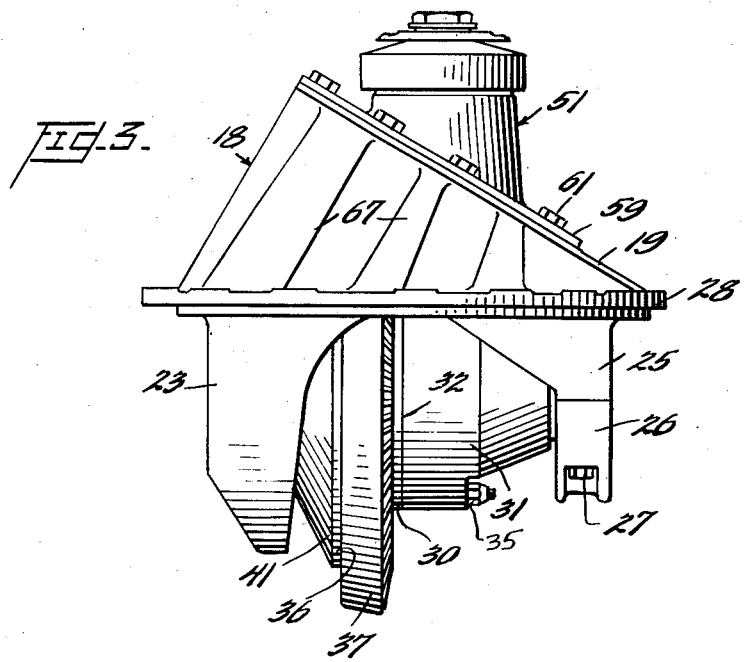
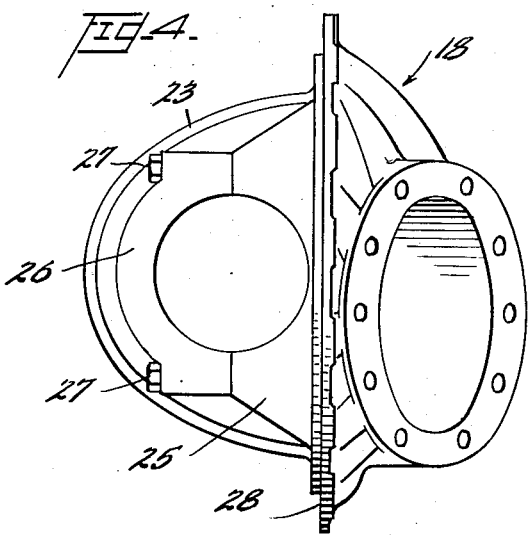
Inventor
Mathew B. Morgan,
Strauch & Hoffman
ATTORNEYS Patented June 13, 1950

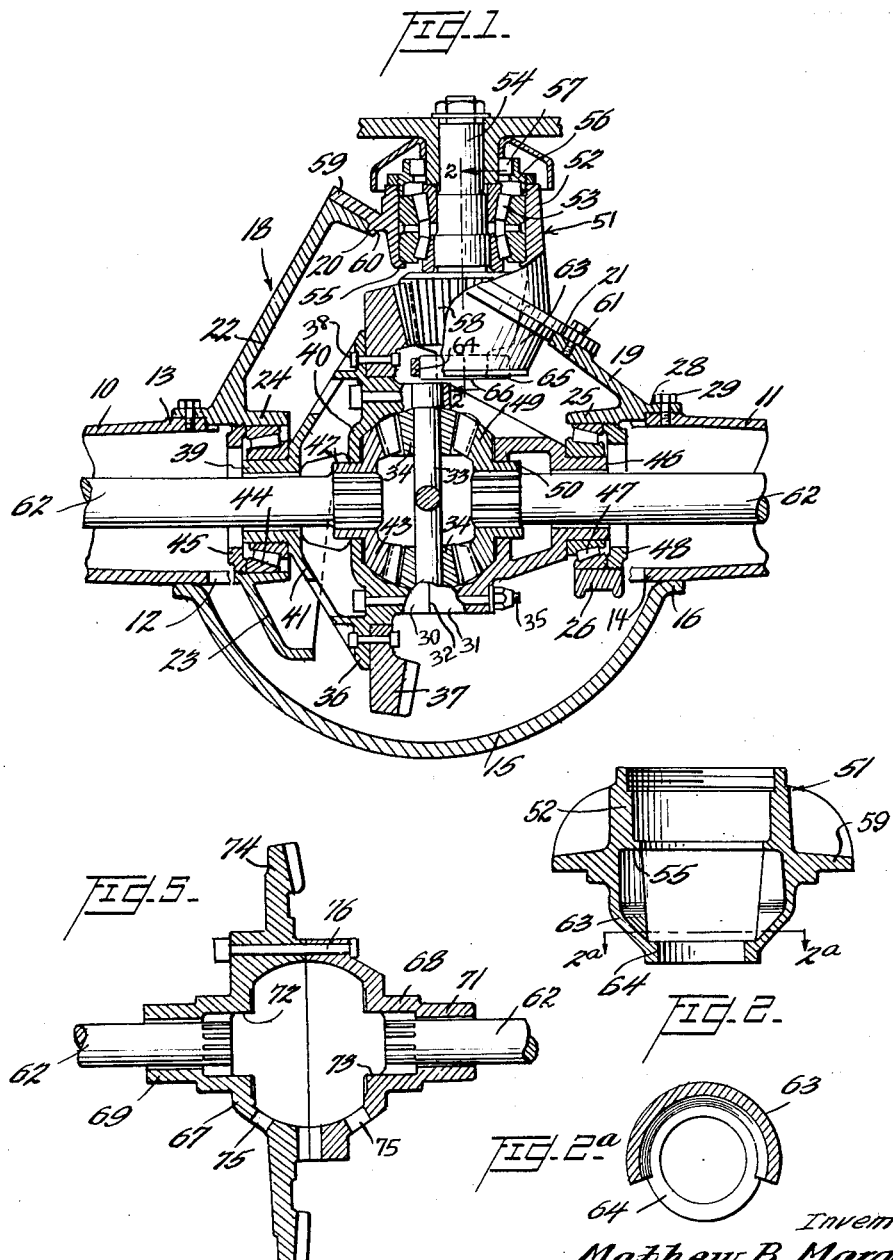

2,510,996

UNITED STATES PATENT OFFICE 2,510,996

DIFFERENTIAL CARRIER

Mathew B. Morgan, Detroit, Mich., assignor to The Timken-Detroit Axle Company, Detroit, Mich., a corporation of Ohio Application May 14, 1945, Serial No. 593,615

14 Claims. (Cl. 74—713)

This invention relates to differential drive axles and more particularly to details of differential carrier construction.

It is a primary object and purpose of the present invention to provide a novel differential carrier for medium and heavy duty service in motor buses, trucks and similar vehicles for the purpose of obtaining a better load distribution of the driving forces to the vehicle wheel axles and minimizing distortion of the axle housing and the destructive effects of the driving stresses on the several parts of the differential unit.

A more particular object of the invention is to provide a novel mounting and arrangement of the differential gearing and its driving pinion shaft upon the carrier whereby the line of division between the two parts of the cage for the differential pinions and side gears will be disposed in a radial plane which includes the axes of the pinions and is closely adjacent to a parallel plane intersecting the intermeshing teeth of the driving pinion and differential drive gear so that angular thrusts incident to the driving torque upon the cage parts and the bearings therefore will be reduced to a minimum.

It is a further object of the invention to provide a two part carrier for the differential mechanism, in which the main body section carrying the differential gears is rigidly secured to the front open side of the axle bowl while the pinion drive shaft with its bearings is carried by a supplemental section detachably secured to the body section of the carrier and removable as a unit therefrom independently of the differential gearing.

A further object of the invention is to provide a novel two-part differential gearing carrier having a novel thrust leg integral with one of the parts for receiving the end of the drive pinion shaft.

A further object of the invention resides in the provision of integral means on the carrier body section supporting large stabilizing thrust bearings for the differential gear cage.

It is also an additional object of the invention to provide a carrier body section having a front wall with the attaching face for said supplemental detachable drive shaft carrier section disposed in a vertical plane diagonally intersecting the axis of the axle, and said body section of the carrier having side, bottom and top walls defining a triangular structure by which longitudinal thrusts forces of the drive shaft are effectively dissipated and not transmitted transversely to the vehicle axle housing, The invention also has for its aim and purpose to provide a novel differential carrier construction particularly designed for application to a banjo type axle and which enables the differential gearing and the pinion drive shaft to be quickly and easily assembled therewith and accurately mounted opposite the axle bowl to facilitate the operative connection of the wheel driving shafts with the differential side gears.

In general, the present invention comprehends an improved differential carrier construction as above characterized, in which a minimum number of parts of simple structural form provide an extremely strong and rugged assembly admirably adapted for use in the transmission of power to the driving wheels of trucks, buses and other heavy duty vehicles.

With the above and other objects in view, the invention comprises the improved differential drive axle, and more particularly the differential carrier structure including the construction and relative arrangement of its several cooperative parts, as will hereinafter be more fully described, illustrated in the accompanying drawings and subsequently incorporated in the subjoined claims. In the drawings wherein I have illustrated several simple and practical embodiments of the invention and in which similar reference characters designate corresponding parts throughout the several views:

Figure 1 is a horizontal sectional view illustrating one embodiment of my improved differential carrier assembly as applied to a banjo type of vehicle axle;

Figure 2 is a section substantially along line 2—2 in Figure 1 illustrating the structure of the carrier section in which the pinion shaft is mounted;

Figure 3 is a top plan view of the differential carrier assembly detached from the axle;

Figure 4 is a side elevation of the carrier, and

Figure 5 is a detail sectional view illustrating a modified form of the differential gear cage in which the driving gear is integrally formed with one of the cage parts.

Figure 2a is a section along line 2a—2a in Figure 2.

Referring now in further detail to the drawings, and for the present more particularly to Figure 1 thereof, for the purpose of illustration, oppositely extending axle housing arms 10 and 11 are integrally joined by a central enlarged housing portion 12 which is open front and rear so as to provide the well known banjo type axle housing. The front opening of housing portion 12 is surrounded with a thickened carrier attachment flange 13. The rear opening of central housing portion 12 is closed by a dish-shaped axle bowl 15 preferably of general semi-spherical form and formed with a continuous laterally projecting marginal flange 16 rigidly secured to the rear bolting flange 14 by welding.

The preferred embodiment of my improved two-section differential carrier, as herein shown, includes a body section 18 having an obliquely inclined front wall 19 provided with an opening 20 therein and a flat bolting face 21 surrounding said opening which is disposed in a vertical plane diagonally intersecting the axis of the axle bowl at about 30°. Carrier section 18 is formed with an integral side wall 22 intersecting front wall 19 at about 90°.

Carrier section 18 is also formed at one side with a depending integral channel-shaped thrust leg 23 extending into the axle bowl and formed co-axially of the axle housing with a short inwardly projecting cylindrical boss 24. On the opposite side from leg 23 carrier section 18 is integrally formed with a half-cylindrical boss 25, the bottom half of which is completed by a half-cylindrical cap 26 secured to boss 25 as by screws 27. At the base of walls 19 and 22, carrier section 18 is formed with an annular external shouldered bolting flange 28 piloted with and adapted to be secured to carrier attachment flange 13 as by bolts 29.

The differential unit includes a cage or support for the pinions and side gears comprising two sections 30 and 31, respectively. The meeting faces of the opposed cage sections, indicated at 32, are recessed to receive the cylindrical outer ends of the four arms of a spider 33 upon which the differential pinions 34 are rotatably mounted. The two cage sections are rigidly connected to retain the differential gearing in assembled relation therewith, as by bolts 35.

The cage section 30 is of somewhat greater diameter than the section 31 and is formed with a flange 36, to the inner side face of which a beveled ring gear 37 is securely fixed as by bolts or rivets 38. The flange 36 is connected with a hub 39 in outwardly spaced relation from the inner side wall 40 of cage section 30 by a sharply inclined wall 41, which if desired may be of skeletonized construction. Cage wall 40 has a central opening, in which the internally splined hub 42 of one of the differential side gears 43 is journaled. Hub 39 of cage section 30 is journaled in a suitable anti-friction bearing assembly 44 mounted in boss 24 of leg 23 and held against axial movement by a retaining member 45 threaded into the outer end of said leg.

The other differential cage section 31 also has a reduced hub extension 46 journaled in an anti-friction bearing 47 mounted in half boss 25 and cap 26 and retained against axial movement by the annular member 48 threaded in those parts. The cage section 31 also has an inner wall spaced from the hub 46 and provided with a central opening in which the other of the differential side gears 49 having the internally splined hub 50 is rotatably journaled. Bearing assemblies 44 and 47 are in accurate axial alignment as predetermined by the bosses in which they are mounted, and the whole carrier section 18 may be sub-assembled quickly prior to its attachment to the axle housing.

The other or supplemental carrier section indicated at 51 comprises a cylindrical boss 52 within which twin combined radial and thrust anti-friction bearings 53 for journalling the pinion drive shaft 54 are mounted. The bearing assembly at 53 is axially held between an inturned annular flange 55 on boss 52 and a removable outer threaded ring 56 which also maintains an oil seal assembly 57 about shaft 54. The front outer end of shaft 54 is adapted to be universally coupled in the usual manner to the rear end of an engine driven propeller shaft (not shown). A bevelled pinion 58 on the inner end of shaft 54 has constantly meshing engagement with ring gear 37 when the supplementary carrier section and the drive shaft 54 are mounted in assembled position upon carrier section 18.

An obliquely inclined attaching or mounting flange 59 is integrally formed with boss 52 and is provided with an annular piloting rib 60 on its inner face to fit within the opening 20 in the front wall 19 of the carrier section 18. Outwardly of rib 60, flange 59 has planar seating contact with the diagonally inclined face 21 and is rigidly secured to wall 19 as by bolts 61. Inwardly of flange 59, carrier section 51 is formed with an inwardly projecting thrust leg 63 integral therewith and partially shrouding the pinion 58. Leg 63 terminates in an inner annular wall 64 transverse to shaft 58 and provided with an opening therein to receive a pilot and thrust bearing assembly 65 for a stub shaft 66 on the inner end of the drive pinion 58.

From the above, it will be noted that the carrier and differential cage structure are such as to provide a balanced mounting of the gearing between the bearings 44 and 47, while the ring gear 37 and pinion spider 33 are so located relative to each other that a plane coincident with the meeting faces of the cage sections and with the axes of the pinions 34 is closely adjacent to a parallel plane which intersects the line of thrust of the teeth of pinion 58 against the teeth of gear 37, while the axis of the drive shaft 54 is off-set slightly to the opposite side of said plane. Thus the destructive effects of driving stresses upon the parts of the differential mechanism, and the cage sections and wear of the cage supporting bearings will be reduced to a minimum. The differential cage is mounted for balanced operation in bearings 44 and 47 which are preferably spaced equidistantly from the plane containing the axes of differential pinions 34.

If desired, side wall 22 of carrier body section 18 may be externally provided with suitably spaced reinforcing ribs, as indicated at 67 in Figure 2 of the drawings. The generally triangular construction of the walls of this body section acts as a truss to distribute and dissipate thrust forces axially of the shaft 54. After the two carrier sections have been assembled in the manner above described with the pinion 58 in mesh with ring gear 37, the whole sub-assembly unit may then be quickly secured to the front side of the axle housing and rigidly mounted in position with the side gears 43 and 49 accurately located within the bowl to receive the splined inner ends of the wheel driving axle shafts 62. By mounting the pinion drive shaft with its main and pilot bearings upon a supplemental carrier section, the latter may be readily detached and removed from the main carrier section 18 for the replacement of the pinion or bearings or other parts as may be required, while the large opening 20 in wall 19 enables the several parts of the differential unit to be visually inspected without dismounting the large main body section 18 of the carrier. The mechanism may thus be maintained in proper working condition with minimum labor and expense.

Integral thrust leg 63 provides a permanently located and rigid support for pilot bearing 65 and is an important part of the invention.

My novel carrier construction as above described comprises parts of simple and rugged structural form, the manufacturing cost of which will be comparatively low, and which enables the differential unit and its drive shaft assembled thereon to be easily, quickly and accurately mounted in proper operative position upon the front side of the axle housing.

In Figure 5 of the drawings I have shown a slightly modified form of the invention wherein the ring gear is integral with one of the differential cage sections. Differential cage sections 67 and 68 are assembled with the differential pinions and side gears in the manner above explained, the cage section having tubular axial extensions 69 and 71 adapted to seat in bearings 46 and 47 and inner journal portions 72 and 73, respectively, of enlarged diameter to rotatably receive the hub portions of the differential side gears, with which the inner ends of the wheel driving axle shafts 62 and 63 have a splined connection, as above described. In this embodiment, a differential ring gear 74 is integrally formed with the cage section 67 thus simplifying the assembly of the several parts of the differential. Each of the gear cage sections may be provided with one or more openings, as indicated at 75 through which lubricant may freely flow to the interior of the housing. Cage sections 67 and 68 are held together by bolt assembles 76, and are mounted in the axle housing as shown in Figure 1 for the other embodiment.

From the foregoing description and the accompanying drawings, the construction, operation and several advantages of my improved differential drive axle will readily be understood. It will be seen that by reason of my improved carrier construction and the mounting and arrangement of the several parts of the differential driving unit thereon, the deleterious effects of driving torque shocks or stresses upon the several parts of the assembly, are effectively nullified. Such destructive stresses are especially severe in heavy duty service. As applied to a banjo type axle used in vehicles of this type, the present invention insures maximum operating efficiency with a minimum distortion of the axle housing and bowl region or stress upon parts which are inherently weak, and also greatly facilitates the assembly and disassembly of the several parts of the differential drive unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a vehicle axle housing having an enlarged differential receiving portion, a differential carrier comprising a body section and a supplemental section, differential gearing mounted on said body section of the carrier including a ring gear, a drive shaft and pinion mounted on said supplemental carrier section, means for detachably securing the supplemental carrier section to said main body section with said pinion in mesh with the ring gear comprising an attachment flange on said supplemental carrier section obliquely inclined relative to the axis of the drive shaft and a cooperating attachment face for said flange on said carrier body section disposed in a vertical plane intersecting the axis of the axle, and means for detachably mounting the carrier body section on one side of the axle housing.

2. The combination defined in claim 1, wherein the body section of the carrier defines a substantially triangular-shaped thrust resistant, stress distributing structure between the axle and the differential drive shaft.

3. In a drive axle, an axle housing having a differential receiving portion, differential drive gearing including a ring gear, a drive shaft and a pinion thereon engaged with said ring gear, a differential carrier and means for mounting said gearing and drive shaft thereon, means for detachably mounting said carrier on one side of the axle housing, and said carrier comprising a substantially triangular shaped body structure constituting a thrust resisting truss between the drive shaft mounting and the axle housing.

4. The combination defined in claim 3, in which the drive shaft mounting comprises a separable unit detachably secured to the carrier body structure.

5. In a drive axle having an axle housing provided with a differential receiving portion, a differential carrier having a part disposed in a plane obliquely intersecting the axis of the axle, means detachably securing said carrier on one side of the axle housing, a differential unit comprising a cage, differential pinions and side gears rotatably mounted in said cage, said carrier having supports projecting therefrom into the axle bowl, bearings journaling said cage in said supports, said bearings being substantially equidistantly spaced from a plane including the axes of the differential pinions, a ring gear rigid with said housing at one side of said plane, a drive shaft journalled on said part with its axis normal to the axis of said axle and having a pinion meshed with said ring gear, and means mounting said drive shaft on the carrier for rotation about an axis at the opposite side of said plane with respect to the ring gear.

6. A differential gear carrier comprising a main section adapted to extend within an axle housing and rotatably supporting differential drive mechanism thereon, a front section detachably mounted on said main section carrying a drive shaft and a pinion for driving said mechanism and means for detachably connecting said carrier sections along surfaces lying in a plane inclined with respect to said axis of rotation of said mechanism.

7. In an axle drive mechanism, a carrier section, a shaft journalled in said section, a pinion rigid with said shaft, an internal support member rigid with said carrier section, an attachment flange on said carrier section disposed at an angle to said shaft axis and means providing a pilot bearing for said shaft end beyond said pinion.

8. In the mechanism defined in claim 7, said support member comprising an integral leg on said carrier section.

9. A pinion shaft carrier for axle drive mechanism comprising an internal pinion shaft bearing support, an attachment flange disposed at an acute angle to the bearing axis, and an integral pinion shaft thrust leg projecting therefrom formed with an annular bearing receiving portion in spaced relation but in axial alignment with said bearing support.

10. The carrier defined in claim 9 wherein said thrust leg is laterally arcuate so as to extend over and partially shroud an associated pinion disposed on a shaft in said bearings.

11. In an axle drive mechanism for an axle housing having a carrier receiving opening, a main carrier section adapted to be secured to said axle housing at said opening and having bearing supporting portions projecting within said axle housing, one of said bearing supporting portions comprising an integral thrust leg formed with an integral bearing receiving boss and the other comprising a bearing receiving socket and a detachable cap therefor, bearings in said portions, differential mechanism journalled in said bearings, a ring gear on said differential mechanism, means providing a forward opening in said carrier surrounded by an attachment surface inclined with respect to the axis of said bearings, a front carrier section detachably secured to said main section, along said surface a pinion shaft journalled in said front section, and a pinion on said shaft meshed with said ring gear.

12. A main differential carrier section for an axle drive mechanism comprising an axle housing attachment portion, a carrier side wall projecting from the front of said portion, a carrier front wall inclined with respect to said portion and apertured for receiving a pinion shaft carrier section, an integral carrier thrust leg projecting from the rear of said portion at one side of said main section and formed with an integral bearing receiving boss, and means providing an aligned bearing support at the other side of said main section.

13. In a drive axle, a differential carrier having an axle housing attachment flange, an integral side wall projecting forwardly of said flange, an integral thrust leg extending rearwardly of said flange substantially opposite the juncture of said side wall with said flange, an integral bearing support boss formed on said leg and a front wall on said carrier having a pinion shaft carrier attachment surface inclined with respect to said flange.

14. In a drive axle, a differential carrier having an axle housing attachment flange, an integral side wall projecting forwardly of said flange, an integral thrust leg extending reawardly of said flange substantially opposite the juncture of said side wall with said flange, said thrust leg being channeled and opening inwardly of said carrier, and an integral bearing boss on said thrust leg extending within the channel.

MATHEW B. MORGAN.

REFERENCES CITED

The following references are of record in the file of this patent:

UNITED STATES PATENTS

| Number | Name | Date |
|---|---|---|
| 1,506,365 | Domizi | Aug. 26, 1924 |
| 1,880,655 | Baits | Oct. 4, 1932 |
| 2,219,025 | Vanderberg | Oct. 22, 1940 |

Certificate of Correction

Patent No. 2,510,996                                             June 13, 1950

MATHEW B. MORGAN

It is hereby certified that errors appear in the printed specification of the above numbered patent requiring correction as follows:

Column 7, line 24, for "section, along said surface a" read *section along said surface, a*; column 8, line 18, for "reawardly" read *rearwardly*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*